3,763,259
PROCESS FOR PRODUCING PARA-
DIISOPROPYLBENZENE
George L. Hervert, Woodstock, Ill., assignor to Universal Oil Products Company, Des Plaines, Ill.
Filed Dec. 15, 1971, Ser. No. 208,262
Int. Cl. C07c 3/52, 3/62, 5/24
U.S. Cl. 260—671 P    10 Claims

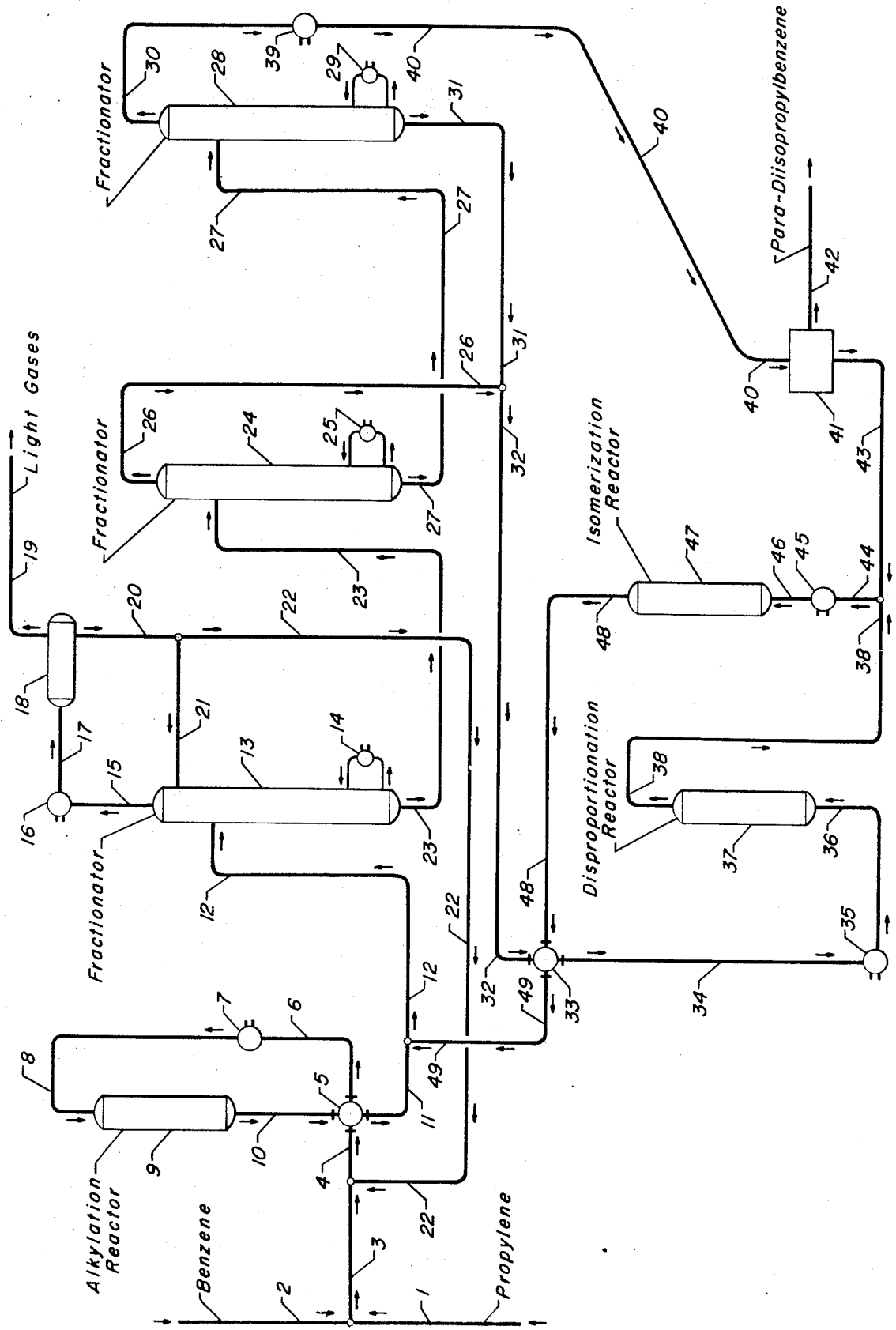

ABSTRACT OF THE DISCLOSURE

A process for producing para-diisopropylbenzene by alkylating benzene with propylene, separating unalkylated benzene, separating cumene, separating polyisopropylbenzenes, and separating ortho- and meta-diisopropylbenzene from the alkylation reaction product to provide para-diisopropylbenzene. The unalkylated benzene is recycled to the alkylation step; cumene and polyisopropylbenzenes are combined and disproportionated; and the disproportionated hydrocarbons and the ortho- and meta-diisopropylbenzene isomers are combined and isomerized. The isomerized hydrocarbons are recycled to the benzene separation step.

BACKGROUND

This invention relates to a process for producing para-diisopropylbenzene from benzene and propylene. In one aspect, this invention relates to the use of alkylation, disproportionation and isomerization to provide complete utilization of reactants in producing para-diisopropylbenzene. In one limited aspect, this invention relates to the use of a combination of alkylation, fractionation, molecular sieve separation, disproportionation and isomerization to provide an extremely effective process for producing paradiisopropylbenzene. In another limited aspect, this invention relates to a process for producing paradiisopropylbenzene from benzene and propylene in which the propylene utilized may be obtained from a readily available and economical source wherein propylene is found in admixture with ethylene, light saturated hydrocarbon gases and hydrogen.

Para-diisopropylbenzene is an important substance in producing various hydrocarbonaceous products. It may be used to produce such products as hydroquinone by processes more economical than conventional processes which make hydroquinone from analine. Para-diisopropylbenzene may also be utilized as a substitute for paraxylene in processes to produce terephthalic acid. It is economically desirable to produce para-diisopropylbenzene from readily available reactants such as benzene and propylene, which may be recovered in petroleum refining operations. Thus, an economical process for the production of para-diisopropylbenzene from propylene and benzene would be of benefit and utility to the chemical and petrochemical industries.

One problem which has been encountered in attempts to utilize petroleum refinery gas streams as an economical source of low molecular weight olefins such as ethylene and propylene, has been difficulty and expense of separating particular mono-olefin compounds for use in producing relatively pure products. For example, in a gas stream containing ethylene and propylene, it is desirable to obtain substantially pure ethylene in order to utilize it to produce products such as ethylbenzene and to obtain substantially pure propylene in order to utilize it to produce propylene polymers, diisopropylbenzenes, cumene, etc. Separating these particular olefins from the refinery streams in which they occur and from each other before using them as reactants is uneconomical because the olefins often occur in relatively dilute concentrations in these streams. It is, therefore, desirable to have a process for utilizing a particular olefin while it remains in dilute concentration in a gas stream and, at the same time, to produce a relatively pure product from the particular olefin without the reaction of other olefins in the feed stream to produce unwanted side products.

It has previously been known to alkylate benzene with propylene and separate out para-diisopropylbenzene. The boiling point of this isomer differs from that of the ortho and meta isomer enough to make possible its separation from them by refractionation rather than by less economically desirable methods such as crystallization. One of the problems associated with producing para-diisopropylbenzene by alkylation is the formation of large fractions of other alkylaromatics including the above-mentioned meta and ortho isomers of diisopropylbenzene as well as cumene and polyisopropylbenzenes such as the triisopropylbenzenes, tetraisopropylbenzenes, etc. The economic utility of a process for producing para-diisopropylbenzene depends partially upon the efficiency with which these other alkylaromatics are converted into para-diisopropylbenzene with a relatively small loss of reactants as undesirable side products. Among the processes which have been disclosed for alkylating benzene with propylene are those employing Friedel-Crafts catalyst such as aluminum chloride, refractory inorganic oxides such as alumina, silica, zirconia, and particular mixtures and compounds of such oxides such as zeolites; other processes and catalysts disclosed are those utilizing free or combined boron trihalide, e.g. boron trifluoride combined with an inorganic oxide. The above noted difficulty encountered in prior art alkylation processes has previously been solved by recycling the undesirable products of the process to the alkylation step in order to effect a transalkylation. However, transalkylation is not favored by the same conditions which favor the primary alkylation reaction. Therefore, these processes do not produce the desired product in the most efficient manner.

SUMMARY OF THE INVENTION

An object of this invention is to provide a process for producing para-diisopropylbenzene. Another object of this invention is to provide a method for using as a reactant a particular olefinic component of a gaseous refinery stream without the necessity of separating the component from other components of the gaseous stream. Still another object of this invention is to provide a process for producing para-diisopropylbenzene from benzene and propylene which will produce a maximum amount of the desired para-diisopropylbenzene and minimize the formation of undesirable side products formed in the process.

In an embodiment, this invention relates to a process for producing a para-diisopropylbenzene product which comprises the steps of: contacting benzene and propylene with an alkylation catalyst in an alkylation zone at alkylation conditions; introducing into a benzene separation zone, and separating therein, at least a portion of the effluent from said alkylation zone to provide a benzene stream and an alkylaromatics stream, and introducing at least a portion of the benzene stream into said alkylation zone; separating at least a portion of said alkylaromatics stream to provide a cumene stream and a cumene-free stream; separating at least a portion of said cumene-free stream to provide a diisopropylbenzenes stream and a polyisopropylbenzenes stream; separating at least a portion of said diisopropylbenzenes streams in a para-diisopropylbenzene separation zone to provide said para-diisopropylbenzene product and an isomers stream comprising ortho-diisopropylbenzene and meta-diisopropylbenzene; contacting at least, a portion of said cumene stream and at least a portion of said polyisopropylbenzene stream with a disproportion catalyst in a disproportionation zone at disproportionation conditions; contacting at least a portion of said isomers stream and at least a portion of the effluent from said disproportionation zone with an isomerization catalyst in an isomerization zone at isomerization conditions; and introducing at least a portion of the effluent from said isomerization zone into said benzene separation zone.

Further objects, embodiments and advantages of the process of the present invention will become apparent from the following description of the accompanying drawing and detailed description of the invention.

DESCRIPTION OF THE DRAWING

The accompanying drawing is a schematic representation of a particular embodiment of the process of the present invention.

Referring to the drawings, propylene feed, which may be, for example, a refinery off gas stream such as the off gas from a catalytic cracking unit or pyrolysis unit, is introduced into conduit 1. Substantially pure benzene is introduced into conduit 2. The feed streams are commingled in conduit 3 and passed into conduit 4, wherein the fresh feed is combined with recycled benzene from conduit 4. The combined feed stream in conduit 4, having a benzene to propylene mole ratio of 0.5 to about 10, is passed into heat exchanger 5, and heated by indirect exchange with effluent from alkylation reactor 9. The heated combined feed is withdrawn from exchanger 5 and passed through conduit 6 to heater 7, wherein the combined alkylation reactor feed is further heated to the temperature desired under alkylation conditions, for example, about 300° F. The combined alkylation reactor feed is then passed through conduit 8 and introduced into alkylation reactor 9. Reactor 9 contains a fixed bed of alkylation catalyst comprising a boron trifluoride-modified substantially anhydrous gamma alumina. The benzene-propylene mixture charged to reactor 9 from conduit 8 is passed in a continuous downflow operation over the fixed bed of catalyst at alkylation conditions, and continuously withdrawn from reactor 9 through conduit 10. The alkylation reactor effluent in conduit 10 is passed into heat exchanger 5 and cooled in indirected heat exchange with fresh combined alkylation reactor feed. The cooled reactor effluent is withdrawn through conduit 11 and passed through conduit 12 to benzene fractionator 13, which is equipped with reboiling means 14 for supplying heat to facilitate separation of benzene and light gases from alkylaromatics. Fractionator 13 may advantageously employ conventional distillation trays or other means for performing the desired separation. Benzene and lighter compounds are withdrawn overhead from fractionator 13 through conduit 15 and passed into cooler 16, wherein benzene is condensed. The overhead from fractionator 13 comprises benzene and any components of the effluent from alkylation reactor 9 which have a lower boiling point than benzene. For example, if the propylene feed introduced into conduit 1 contains hydrogen, nitrogen, methane, ethane, propane, ethylene, $C_4$ and $C_5$ paraffins, etc., these components are recovered in the overhead from fractionator 13. When the overhead is cooled in cooler 16, benzene is liquified, while lighter components of the overhead, such as ethylene, remain in the vapor phase. The mixed vapor and liquid phase overhead is withdrawn from cooler 16 and passed through conduit 17 to flash separation vessel 18. In vessel 18, a liquid phase comprising benzene is settled, while a vapor phase containing light gases such as ethylene is wtihdrawn and passed out of the process through conduit 19. The settled benzene in vessel 18 is removed through conduit 20. A first portion of the benzene stream in conduit 20 is refluxed to the upper end of fractionator 13 by way of conduit 21, while a second portion of the benzene stream is passed into conduit 22 and recycled to conduit 4 where it is combined with fresh alkylation reactor feed. Referring to fractionator 13, a bottoms product comprising cumene, diisopropylbenzenes and polyisopropylbenzenes is withdrawn through conduit 23. If desired, a portion of the bottoms product may be heated and returned to the lower end of fractionator 13 for reboiling purposes in a conventional manner. In the embodiment shown and described herein, the bottoms product is passed through conduit 23 to cumene fractionator 24, which contains reboiling means 25 for aid in separating cumene from more highly substituted alkylaromatics. Fractionator 24 may include other conventional fractionation equipment such as trays, packing, etc. Fractionator 24 provides the separation of cumene from diisopropylbenzenes and polyisopropylbenzenes. Cumene is withdrawn overhead through conduit 26. A portion of the overhead in conduit 26 may be conventionally refluxed to the upper end of fractionator 24, if desired. Diisopropylbenzenes and polyisopropylbenzenes in fractionator 24 are withdrawn as a bottoms product through conduit 27 and passed to diisopropylbenzenes fractionator 28. A portion of the bottoms product in conduit 27 may be heated and returned to the lower end of fractionator 24 for reboiling purposes if desired. Fractionator 28 provides the separation of diisopropylbenzenes from polyisopropylbenzenes, and is equipped with reboiling means 29. Fractionator 28 may also be provided with other conventional fractionation equipment such as trays, packing, etc., to aid in the required separation. Ortho-, meta-, and para-diisopropylbenzene are withdrawn overhead from fractionator 28 through conduit 30. Polyisopropylbenzenes are withdrawn as a bottoms product from fractionator 28 through conduit 31. A portion of the overhead stream in conduit 30 may be employed for reflux purposes and, similarly, a portion of the bottoms stream in conduit 31 may be heated and employed for reboiling purposes in fractionator 28. The bottoms stream in conduit 31 is passed into conduit 32 and combined therein with the cumene separator overhead in conduit 26. The combined stream in conduit 32, comprising cumene and polyisopropylbenzenes, is passed into heat exchanger 33 and heated in indirect heat exchange with effluent from isomerization reactor 47. The heated cumene and polyisopropylbenzenes are wtihdrawn from exchanger 33 and passed through conduit 34 to heater 35, wherein the cumene and polyisopropylbenzenes are heated to the temperature desired in disproportionation reactor 37. Effluent from the heater 35 is passed through conduit 36 into disproportionation reactor 37. A fixed bed of disproportionation catalyst, for example, boron trifluoride-modified substantially anhydrous gamma alumina, is placed in reactor 37 and the cumene and polyisopropylbenzenes from conduit 36 are passed over the catalyst bed in a continuous upflow operation and withdrawn from reactor 37 through conduit 38.

The diisopropylbenzenes overhead stream in conduit 30 is passed into cooler 39 and condensed into the liquid phase. The cooled diisopropylbenzenes are withdrawn from cooler 39 and passed through conduit 40 to para-diisopropylbenzene separation zone 41. Separation zone 41 is a molecular sieve separation zone employing a crystalline aluminosilicate adsorbent to separate the desired product of the process, para-diisopropylbenzene, from the ortho and meta isomers. The feed stream from conduit 40 is contacted with the adsorbent, which selectively adsorbs para-diisopropylbenzene. The meta and ortho isomers are then withdrawn from contact with the adsorbent, for example, by the use of a purging stream of liquid hydrocarbons. The meta and ortho isomers are then separated from the purging liquid, and withdrawn from the separation zone through conduit 43. The selectively adsorbed para isomer is subsequently desorbed from the crystalline aluminosilicate, for example, using a liquid hydrocarbon desorbent which may conveniently be the same composition as that employed in the purging operation. Other purging and desorption methods may also be employed, such as vacuum effects, heating, gaseous streams, etc. The desorbed para-diisopropylbenzene is separated from the desorbent, if necessary, recovered from separation zone 41 through conduit 42, and passed out of the process as the product thereof.

The disproportionation reactor effluent in conduit 38 and the ortho and meta isomers stream in conduit 43 are combined in conduit 44, passed into heater 45, and heated to the temperature desired in isomerizaion reactor 47. The heated isomerization reactor feed is then passed through conduit 46 and introduced into isomerization reactor 47. Reactor 47 is maintained at alkylaromatic isomerization conditions and contains a fixed bed of an alkylaromatic isomerization catalyst, for example, a boron trifluoride-modified substantially anhydrous gamma alumina. The reactor feed is passed in continuous upflow over the catalyst bed and withdrawn from reactor 47 through conduit 48. The isomerization reactor effluent in conduit 48 is introduced into heat exchanger 33 and passed in indirect heat exchange with disproportionation reactor feed in conduit 32. The cooled isomerization reactor effluent is withdrawn from exchanger 33, passed through conduit 49 to conduit 12, and combined therein with the effluent from alkylation reactor 9.

Various conventional equipment necessary for the operation of the process is not depicted or described in the attached drawing of the foregoing description thereof, including, for example, pumps, compressors, valves, etc. The equipment required and its use in the process of the present invention will be apparent to those skilled in the art from the foregoing and from the detailed description of preferred embodiments which follows.

DETAILED DESCRIPTION

Within the scope of the present invention, the propylene reactant may suitably comprise substantially pure propylene or propylene in admixture with one or more hydrocarbonaceous compounds, with hydrogen, or with such gases as nitrogen, methane, etc. For example, propylene admixed with hydrogen, methane, ethane, ethylene, propane, butanes, or two or more of the foregoing, is a suitable propylene reactant. The propylene reactant may comprise a petroleum refinery off gas stream wherein propylene occurs in dilute concentrations admixed with ethylene, hydrogen, and light saturated hydrocarbon gases. The propylene component in such a refinery off gas stream may be utilized to alkylate benzene in the presence of ethylene, when the preferred alkylation catalyst, hereinafter described, is employed in the alkylation zone, without alkylating ethylene. An economically desirable product, para-diisopropylbenzene may thereby be produced without the formation of undesirable side products in the alkylation zone. Further, the ethylene in such a stream may be recovered free from propylene and utilized as a relatively pure source of this olefin. Thus, the light gases recovered from the alkylation zone after reaction of the propylene component thereof, provide an excellent source of ethylene for use in producing, for example, ethylbenzene.

The benzene reactant to be utilized in an embodiment of the present invention may suitably be pure benzene, or may be benzene in admixture with such hydrocarbons as naphthenes, toluene, cumene, etc. It is preferred that the benzene reactant be fairly pure benzene, for example, about 95 wt. percent benzene or greater.

The alkylation zone utilized in the present process may suitably be a conventional type of aromatic alkylation vessel, various particular forms of which are known in the art. The alkylation zone may be equipped with heating means, baffles, trays, packing, etc. Both alkylation schemes employing a batch type operation and schemes employing a continuous type operation are suitable for use in the present process; however, a continuous operation is preferred because of simplicity and economic advantages which are well known.

An alkylation catalyst for use in the process of this invention may be any suitable aromatic alkylation catalyst known to the art. For example, Friedel-Crafts metal halides have been utilized, and are suitable for use in the present process. Hydrogen halides, boron halides, Group I-A metal halides, iron group metal halides, etc. have been found suitable. Refractory inorganic oxides, combined with the above-mentioned and other known catalytic materials, have been found useful. For example, various forms of alumina, including gamma alumina and theta alumina, silica, magnesia, zirconia, etc., may be utilized. Crystalline aluminosilicates have also been utilized, including for example, faujasite, mordenite, or zeolite X, and those may suitably be employed in the present process. Other materials suitable as an alkylation catalyst include combinations of inorganic oxides with metals such as those in Group VIII of the Periodic Table, and mixtures or compounds of inorganic oxides with rare earth metals. The above-mentioned suitable materials are noted as examples only and are not meant to constitute a complete list of suitable materials. Persons skilled in the art will recognize that a large number of materials exist which may suitably be employed as an alkylation catalyst within the scope of this invention, but that the results will not necessarily be equivalent.

A preferred alkylation catalyst in the present process is a boron trihalide-modified refractory inorganic oxide, for example, a boron trifluoride-modified gamma or theta alumina. Other suitable inorganic oxides include silica, titania, zirconia, chromia, magnesia, zinc oxide, calcium oxide, etc. A boron trifluoride-modified alumina catalyst may be prepared by drying and calcining alumina and subsequently contacting the alumina with from about 2 wt. percent to about 100 wt. percent of boron trifluoride based on the alumina at a temperature below about 600° F. Alternately, boron trifluoride may be added to an alkylatable aromatic hydrocarbon, such as benzene, and charged to an alkylation zone containing a fixed bed of dried and calcined alumina. A more detailed description of the preparation and use of boron trihalide-modified refractory inorganic oxides as aromatic alkylation catalysts may be found in U.S. Pats. 2,939,890, 3,054,835 and 3,068,301. Typically, in a process utilizing such a catalyst, particularly in the alkylation of benzene with ethylene, a boron halide is continuously charged to an alkylation zone in admixture with one or more reactants and subsequently recovered from the effluent from the alkylation zone for further use. I have found that the continuous addition of boron trihalide is not required for the alkylation of benzene with propylene, making possible the alkylation of propylene without the alkylation of ethylene in a propylene-ethylene mixture. Thus, the present process may employ an ethylene-containing propylene feed when the preferred alkylation catalyst is utilized, and thereby effect a relatively complete separation of these two olefins in an economical manner.

Alkylation conditions in the present process include a temperature in the range from about 200° F. to about 520° F., preferably from about 250° F. to about 450° F., a pressure in the range from about 1 atmosphere to about 200 atmospheres or more, and a benzene to propylene mole ratio in the feed to the alkylation zone of about 0.5 to about 10.

Means for separating benzene from a mixture of benzene and alkylaromatics are well known in the art. It is preferred that fractionation of the effluent from the alkylation zone be employed in the present process to separate benzene because fractionation is relatively simple and economical. Similarly, cumene may be separated conveniently from a mixture of cumene and di- and polyisopropylbenzenes by fractionation, and diisopropylbenzenes may be separated from polyisopropylbenzenes, e.g. triisopropylbenzenes, tetraisopropylbenzenes, etc., in the same way. Such fractionation often employs reboiling and refluxing to a fractionation vessel, and the fractionation vessels utilized typically contain trays, baffle sections, etc., to aid in separation. The term benzene separation zone is meant to include, for example, a conventional fractionation vessel and the conventional ancillary equipment thereof.

Para-diisopropylbenzene may be separated from ortho-diisopropylbenzenes and meta-diisopropylbenzene by various means, including fractionation, crystallization and molecular sieve adsorption. The above noted and any other means suitable may be employed in the present process. A preferred method for separating the para isomer from the meta and ortho isomers is the use of a crystalline aluminosilicate to preferentially adsorb one component while rejecting another component.

Aluminosilicate adsorbents suitable for use include, for example, type X and type Y zeolites which contain selected cations at the exchangeable cationic sites within the crystalline structure. A more detailed description of representative suitable zeolites may be found in U.S. Pat. 2,882,244 and 3,130,007. Such adsorbents may contain binder materials in order to maintain them in a particle size useful for isomers separation. Both natural and synthetic aluminosilicates may be used as adsorbents. As originally prepared, such zeolites are comprised of a cage structure built up from $AlO_4$ and $SiO_4$ tetrahedra, with the cages occupied by water molecules. Electrochemical neutrality is preserved by the association of a cation, such as sodium, with each $AlO_4$ tetrahedron in the structure. When dehydrated, for example, by calcination, the crystalline network is preserved in the zeolite, resulting in a well-defined structure of pores and channels. Prior to dehydration, the cation content of the zeolite may be modified by the substitution of one or more cations for the original cations. For example, cations from the group of potassium, rubidium, cesium, barium, copper, silver, lithium, sodium, beryllium, magnesium, calcium, strontium, cadmium, cobalt, nickel, manganese and zinc, or a combination thereof may be employed in an adsorbent.

The separation of the para isomer from the meta and ortho isomers utilizing such crystalline aluminosilicate adsorbents may be performed in a batch, continuous fixed bed or moving bed system. In a batch system, the mixture of isomers is passed into an adsorbent chamber for a predetermined period of time after which the feed is stopped and any remaining isomers feed mixture between the adsorbent particles can be purged from the chamber. A desorbent material may then be passed into the chamber to help remove the adsorbed component from the adsorbent. In the continuous fixed bed or moving bed systems, the adsorption and desorption are continually taking place. This allows continuous production of a stream of the para isomer and continuous use of the feed mixture of isomers and desorbent. Suitable desorbents for use in this separation step include materials that are easily separable from the diisopropylbenzenes. The scope of the separation step in the present process includes embodiments wherein the para isomer is preferentially adsorbed and embodiments wherein the meta and ortho isomers are preferentially adsorbed. Examples of suitable desorbents include, for example, benzene, toluene, cumene, ethylbenzene, as well as esters, alcohols, cyclic dienes, the ketones, etc., including desorbent mixtures having both higher and lower boiling points than the diisopropylbenzene isomers. Gaseous materials such as nitrogen, hydrogen, methane, ethane, etc., may also be suitable.

In the preferred molecular sieve method for separating the para isomer from the meta and ortho isomers, para-diisopropylbenzene separation conditions include both liquid and vapor phase operations. Liquid phase operation is preferred because of the lower temperature requirements and improved selectivities associated therewith. Separation conditions also include a temperature in the range from about 100° F. to about 500° F. and a pressure in the range from about 1 atmosphere to about 35 atmospheres or higher. It is preferred to use pressures below about 35 atmospheres because of known economic advantages associated with lower pressure operations. The desorption of the selectively adsorbed component may be effected at reduced pressures or elevated temperatures or both. For example, vacuum purging of an adsorbent to remove the adsorbed component from the adsorbent may be utilized.

In general, in using the preferred separation method, the diisopropylbenzenes stream, recovered from fractionating the cumene-free isopropylbenzenes stream, is contacted with a suitable adsorbent, and, depending on the adsorbent utilized, either para-diisopropylbenzene or a mixture of ortho- and meta-diisopropylbenzenes will be preferentially adsorbed. Subsequently, the non-adsorbed component is withdrawn from contact with the adsorbent. In an embodiment wherein para-diisopropylbenzene is preferentially adsorbed, the non-adsorbed component comprises the ortho and meta isomers, and forms the isomers stream to be charged to the isomerization zone. The adsorbed para-diisopropylbenzene is subsequently desorbed by utilizing the above described desorbents or other means, separated from the desorbent utilized, if any, and recovered as the product of the process. Similarly, in an embodiment wherein ortho- and meta-diisopropylbenzene are preferentially adsorbed, the non-adsorbed component, comprising the para isomer, is withdrawn from contact with the adsorbent and recovered as the product of the process. The adsorbed ortho- and meta-diisopropylbenzenes are subsequently desorbed by utilizing the above-described desorbents or other means, and separated from the desorbent, if any, to form the isomers stream to be charged to the isomerization zone.

The separation of various components by fractionation often results in less than a perfect separation, so that when, for example, benzene is separated from alkylaromatics, the resulting benzene stream will contain minor amounts of alkylaromatics and the resulting alkylaromatics stream will contain minor amounts of benzene. Similarly, in the separation of a cumene stream, a diisopropylbenzenes stream or a polyisopropylbenzenes stream by fractionation means, the resulting separated streams will contain minor amounts of other hydrocarbons. The scope of the present invention is intended to include embodiments wherein a particular stream, described as comprising a specific compound or isomer, also contains minor amounts of other compounds. For example, a stream described herein as a polyisopropylbenzene stream is intended to include both embodiments wherein the stream is substantially composed solely of triisopropylbenzenes, tetraisopropylbenzenes and higher molecular weight hydrocarbons and embodiments wherein the stream comprises primarily the foregoing hydrocarbons with minor amounts of diisopropylbenzenes, etc.

Among the materials which may suitably be utilized as a disproportionation catalyst in an embodiment of the present process are inorganic oxides such as alumina, silica, zirconia, magnesia, thoria, etc. and mixtures thereof, either per se, or modified by, or combined with, other materials such as boron trihalides, elements from Group VIII of the Periodic Table, etc. Also suitable as a disproportionation catalyst are particular forms and combinations of inorganic oxides such as zeolites, including faujasite, mordenite, zeolite, X, etc., either alone or in combination with rare earth metals and/or elements from Group VIII of the Periodic Table. A preferred mateial for use as the disproportionation catalyst in an embodiment of the inventive process is a boron trihalide-modified refractory inorganic oxide, e.g. a boron trifluoride-modified substantially anhydrous gamma or theta alumina. This preferred material is substantially the same as that discussed above as a preferred alkylation catalyst. The above-noted suitable materials are listed as examples only, and are not intended to constitute a limitation as to the materials which may be utilized in a particular embodiment of this process as a suitable disproportionation catalyst. Many other suitable materials will be apparent to those skilled in the art.

The above listed materials which may suitably be utilized as the disproportionation catalyst may also be suitably utilized in embodiments of this process as the isomerization catalyst. The materials listed above as suitable for use as a disproportionation catalyst, which are suitable also for use as isomerization catalysts, are intended to be noted hereby only as examples of suitable isomerization catalysts and are not intended to exclude other suitable matetrials which may be utilized in the practice of the invention. Persons skilled in the art will recognize that various other suitable materials exist which may be utilized either as disproportionation catalyst, as an isomerization catalyst, or as both. The scope of the present process is not limited to materials which are suitable both as disproportionation and isomerization catalyst. The scope of the present invention is intended to include embodiments in which one material is utilized as an alkylation catalyst, a disproportionation catalyst and an isomerization catalyst, embodiments in which three different materials are utilized to perform the three above-mentioned catalytic functions, and embodiments where one material is utilized to perform two of the three catalytic functions while a second material is utilized to perform the remaining catalytic function. A preferred materal for use as the isomerization catalyst in an embodiment of the present process is a boron trihalide-modified refractory inorganic oxide, such as a boron trifluoride-modified substantially anhydrous gamma or theta alumina. This preferred material is substantially the same as that discussed above as the preferred alkylation catalyst.

It is contemplated that the primary reactions taking place in the disproportionation zone will be the transfer of isopropyl hydrocarbon radicals from polyisopropylbenzenes to cumene, forming the isomers of disopropylbenzene. This type of rearrangement is also termed transalkylation. The contemplated primary reactions taking place in the isomerization zone are those in which the para isomer of diisopropylbenzene is formed from the meta and ortho isomers by molecular rearrangement of isopropyl hydrocarbon radicals within molecules.

The disproportionation step in the present process may be embodied in a batch reaction scheme or a continuous reaction scheme. A continuous scheme is preferred, wherein the disproportionation catalyst is employed as a fixed bed in the disproportionation zone, and the cumene stream and polyisopropylbenzenes stream are continuously charged to the disproportionation zone, passed over the catalyst bed, and withdrawn. Various vessels suitable for use as a disproportionation zone are well known in the art. Such vessels may be equipped with heating means, baffles, trays, packing, etc.

In the present process, disproportionation conditions include a temperature in the range from about 0° F. to about 600° F., and a pressure in the range from about 1 atmosphere to about 50 atmospheres or more. Preferably, disproportionation conditions include a temperature of about 200° F. to about 500° F. and a pressure of about 1 atmosphere to about 40 atmospheres.

The isomerization step in the process of this invention may be embodied in a batch or continuous operation. Preferably, a continuous operation is employed, with a fixed bed of the isomerization catalyst being placed in the isomerization zone and with the isomers stream recovered from the para-diisopropylbenzene separation zone and the effluent from the disproportionation zone being continuously charged to the isomerization zone, passed over the bed of isomerization catalyst and withdrawn. Various suitable isomerization zones are well known in the art. An isomerization zone typically comprises a vessel capable of containing the isomerization catalyst and the isomerizable hydrocarbons at isomerization conditions. Such a vessel may be utilized in the isomerization step in the present process, and may suitably be equipped with heating means, heat exchange means, baffles, trays, packing, etc.

Suitable isomerization conditions in the process of this invention include a temperature in the range from about 0° F. to about 600° F., and a pressure in the range from about 1 atmosphere to about 20 atmospheres or more. Preferably, isomerization conditions will include a temerature in the range from about 200° F. to about 500° F. and a pressure in the range from about 5 atmospheres to about 10 atmospheres.

It is intended that the scope of the present invention include embodiments wherein the disproportionation zone and the isomerization zone comprise two distinct zones, including embodiments wherein both of said zones are enclosed within one vessel and embodiments wherein one of said zones is enclosed within one vessel and the other of said zones is enclosed within another vessel. The effluent from the isomerization zone is passed to the benzene separation zone along with the effluent from the alkylation zone.

The present process may also be applicable to the production of other dialkylbenzenes from benzene and an olefinic hydrocarbon other than propylene. It is an obvious modification of the present process to substitute another olefinic reactant such as ethylene, 1-butene,2-butene or isobutylene for propylene in the feed to the alkylation zone and recover, if desired, the para isomer of the resulting dialkylbenzenes by the process herein disclosed. For example, if ethylene is substituted for propylene in the feed to the alkylation zone, para-diethylbenzene may be recovered as a product of the process rather than para-diisopropylbenzene. Such a modification would necessitate minor changes in appropriate alkylation, separation, disproportionation and isomerization conditions, which are obvious in view of the description of the process hereinbefore provided.

I claim as my invention:

1. A process for producing a para-diisopropylbenzene product which comprises the steps of:
   (a) contacting benzene and propylene with an alkylation catalyst in an alkylation zone at alkylation conditions;
   (b) introducing into a benzene separation zone and separating therein at least a portion of the effluent from said alkylation zone to provide a benzene stream and an alkylaromatics stream, and introducing at least a portion of the benzene stream into said alkylation zone;
   (c) separating at least a portion of said alkylaromatics stream to provide a cumene stream and a cumene-free stream;
   (d) separating at least a portion of said cumene-free stream to provide a diisopropylbenzenes stream and a polyisopropylbenzenes stream;
   (e) separating at least a portion of said diisopropylbenzenes stream in a para-diisopropylbenzene separation zone to provide said paradiisopropylbenzene product and an isomers stream comprising ortho diisopropylbenzene and metadiisopropylbenzene;
   (f) contacting at least a portion of said cumene stream and at least a portion of said polyisopropylbenzenes stream with a disproportionation catalyst in a disproportionation zone at disproportionation conditions;
   (g) contacting at least a portion of said isomers stream and at least a portion of the effluent from said disproportionation zone with an isomerization catalyst in an isomerization zone at isomerization conditions; and
   (h) introducing at least a portion of the effluent from said isomerization zone into said benzene separation zone.

2. The process of claim 1 further characterized in that said alkylation catalyst is a boron halide-modified inorganic oxide.

3. The process of claim 1 further characterized in that said alkylation catalyst is selected from boron trifluoride, phosphoric acid, aluminum chloride, sulfuric acid, hydrogen fluoride and hydrogen chloride.

4. The process of claim 1 further characterized in that said alkylation catalyst is a crystalline aluminosilicate.

5. The process of claim 1 further characterized in that said disproportionation catalyst is a boron halide-modified inorganic oxide.

6. The process of claim 1 further characterized in that said disproportionation catalyst is a crystalline aluminosilicate.

7. The process of claim 1 further characterized in that said isomerization catalyst is a boron halide-modified inorganic oxide.

8. The process of claim 1 further characterized in that said isomerization catalyst is a crystalline aluminosilicate.

9. The process of claim 1 further characterized in that said para-diisopropylbenzene product and said isomers stream are separated by fractionation.

10. The process of claim 1 further characterized in that said para-diisopropylbenzene product and said isomers stream are separated by molecular sieve separation utilizing a crystalline aluminosilicate adsorbent.

References Cited
UNITED STATES PATENTS

| | | | |
|---|---|---|---|
| 2,744,150 | 5/1956 | Enos | 260—671 P |
| 2,817,687 | 12/1957 | Enos | 260—671 P |
| 2,817,688 | 12/1957 | Enos | 260—671 P |
| 2,848,514 | 8/1958 | De Keizer et al. | 260—671 P |
| 2,818,452 | 12/1957 | Mavity | 260—671 P |
| 2,839,591 | 6/1958 | Enos | 260—671 P |
| 2,860,173 | 11/1958 | Jones et al. | 260—671 P |
| 2,883,438 | 4/1959 | Egbert | 260—671 P |
| 2,920,118 | 1/1960 | Landan et al. | 260—671 P |
| 3,184,517 | 5/1965 | Lee et al. | 260—671 P |
| 3,551,510 | 12/1970 | Pollitzer et al. | 260—672 T |

CURTIS R. DAVIS, Primary Examiner

U.S. Cl. X.R.

260—668 A, 672 T